United States Patent [19]

Lazarus et al.

[11] 4,310,658

[45] Jan. 12, 1982

[54] PRODUCTION OF POLYESTER THERMALLY STABILIZED WITH AN OXIRANE

[75] Inventors: Stanley D. Lazarus, Petersburg, Va.; Robert S. Cooke, Morris Plains; Paul E. Galick, Budd Lake, both of N.J.

[73] Assignee: Allied Corporation, Morris Township, Morris County, N.J.

[21] Appl. No.: 160,418

[22] Filed: Jun. 18, 1980

[51] Int. Cl.³ ............................................. C08G 63/76
[52] U.S. Cl. .................................... 528/309; 528/272
[58] Field of Search ............... 260/45.8 AH; 528/297, 528/309

[56] References Cited

U.S. PATENT DOCUMENTS

| 3,869,427 | 3/1975 | Meschke et al. | 528/297 |
| 4,071,504 | 1/1978 | Korver | 528/297 |
| 4,139,521 | 2/1979 | Lazarus et al. | 260/45.8 NB |
| 4,144,285 | 3/1979 | Maschek et al. | 528/309 |
| 4,205,157 | 5/1980 | Duh | 528/309 |

OTHER PUBLICATIONS

Sorokin et al., Chem. Abs., vol. 54, 1960, 17357i.

Primary Examiner—Morton Foelak
Assistant Examiner—R. A. White
Attorney, Agent, or Firm—Richard A. Anderson

[57] ABSTRACT

High molecular weight linear condensation polyesters are stabilized against deterioration by heat with a stabilizer comprising 2-(phenoxy methyl)-3-phenyl oxirane.

12 Claims, No Drawings

PRODUCTION OF POLYESTER THERMALLY STABILIZED WITH AN OXIRANE

BACKGROUND OF THE INVENTION

1. Field of the Invention

This invention relates to a heat stable fiber forming polyester and a new and novel process for preparing it. More particularly, this invention relates to an improved linear high molecular weight heat stable polyester especially suitable for preparing fibers which have excellent resistance to degradation when utilized in commercial articles, such as tires, industrial belting, etc., wherein a high degree of heat is built up during use.

2. Description of the Prior Art

High molecular weight polyethylene terephthalate fiber forming polyesters are well known. They are prepared commercially either by the ester interchange reaction between dimethyl terephthalate and ethylene glycol or by the direct esterification process wherein terephthalic acid is reacted directly with ethylene glycol. These products and processes are well documented in U.S. Pat. Nos. such as 2,465,310; 3,050,533; 3,051,212, 3,427,287, and 3,484,410 which cover not only the basic products and processes but many improvements thereon.

Polyethylene terephthalate fibers and cords are known to exhibit excellent dimensional stability, that is, low extension or growth during service, as well as to have a high resistance to thermal degradation; however, in pneumatic tires and industrial belts under high speed conditions under heavy load, loss of tensile strength is experienced due to high temperature conditions emanating under such conditions. Efforts to remedy this problem have all too often been ineffective. Most research in this field has been directed to producing a high molecular weight linear polyester having a low content of free carboxyl groups. The following patents are pertinent.

U.S. Pat. 3,051,212 to William W. Daniels relates to reinforced rubber articles and to textile cords and fibers for reinforcing such articles. This patent discloses that a linear terephthalate polyester having a concentration of free carboxyl groups of less than 15 equivalents per million grams may be prepared in a number of different ways. One effective procedure is to treat the filaments, after they have been formed, with a chemical reagent which reacts with and "caps" the free carboxyl group. One such agent is diazomethane.

U.S. Pat. No. 3,627,867 to Eckhard C. A. Schwarz discloses a process and apparatus for melt spinning high molecular weight polyethylene terephthalate into high performance fibers under conditions which reduce the normally high viscosity of such polyester. Ethylene oxide or other lowboiling oxirane compound is injected under pressure into molten polyester before it is fed to the metering pump of the melt spinning machine. The fibers are characterized by low free-carboxyl content and freedom from voids which might be expected from injection of the volatile material.

U.S. Pat. No. 3,657,191 to Rudolph Titzmann et al. is directed to a process for the manufacture of linear polyesters having an improved stability with respect to compounds with active hydrogen. Polyesters of this type are obtained by reacting polyesters with ethylene carbonates or monofunctional glycidyl ethers. The reaction is first carried out within a temperature range lying 10° C. to 60° C. below the softening point of the polyester and is then terminated during the melting and melt-spinning process. U.S. Pat. No. 3,869,427 to Robert W. Meschke et al. discloses a process of preparing polyester filaments having low free-carboxyl group contents which give superior performance in pneumatic tires and other reinforced rubber articles where heat degradation is a problem. Reduction of free carboxyl groups is achieved by mixing with the molten polyester, prior to melt-spinning, 1,2-epoxy-3-phenoxypropane or 1,2-epoxy-3-n-hexyloxypropane.

U.S. Pat. No. 4,016,142 to William Alexander et al. discloses preparation of a fiber-forming polyester wherein the number of free carboxyl end groups present in the polymer may be reduced by adding to the polymerized polyester a glycidyl ether which reacts with the carboxyl end groups present to form free hydroxyl end groups.

The subject of U.S. Pat. No. 4,139,521 high molecular weight polyester using a carboxyl scavenger, N-(2,3-epoxypropyl)phthalimide, has many desirable characteristics. However, the scavenger has not been used in a commercial process because it has been found to be a mutagen in the Ames test. Since it is known that small changes in structure can reduce or eliminate mutagenicity (D. R. Wade, S. C. Airy, J. E. Sinsheimer, Mutation Research 58, pp. 217-223 [1978]), a program was initiated to modify N-(2,3-epoxypropyl)-phthalimide in order to reduce its mutagenicity. Modifications were also carried out with phenyl glycidyl ether, a commercially used polyester carboxyl scavenger which is not only positive in the Ames test, but which is an experimental animal carcinogen.

N-(2,3-epoxypropyl)phthalimide, phenyl glycidyl ether and seven other compounds which were synthesized in our laboratories are listed in the summary table along with results of laboratory evaluation tests on their carboxyl scavenging abilities. It is shown that four of the modified compounds retain their ability to react efficiently with polyester carboxyl end groups. Synthetic schemes used to prepare the modified epoxides in the laboratory are shown as follows.

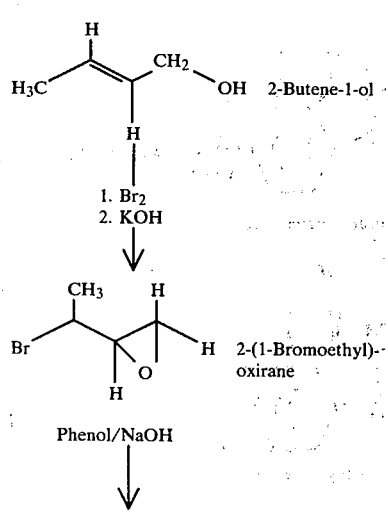

-continued

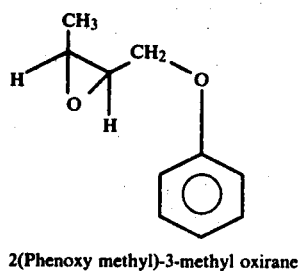

2(Phenoxy methyl)-3-methyl oxirane

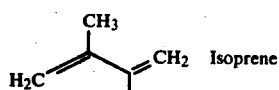
Isoprene

↓ HBr

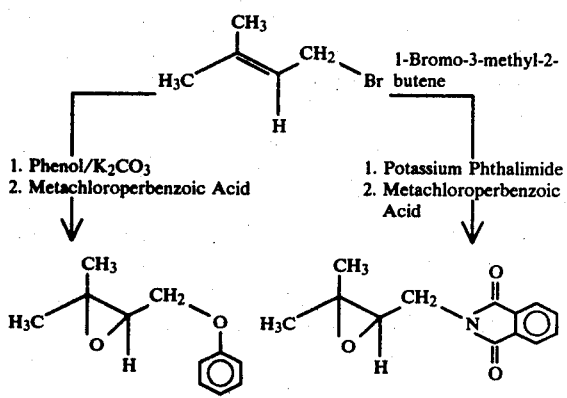

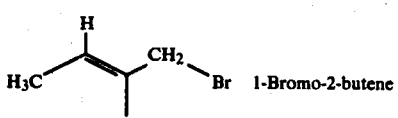
1-Bromo-2-butene

Potassium Phthalimide ↓

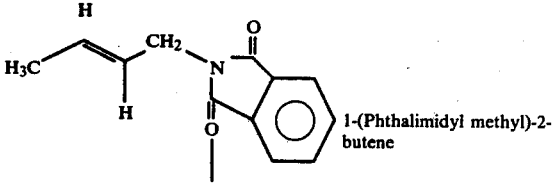
1-(Phthalimidyl methyl)-2-butene

Metachloroperbenzoic Acid ↓

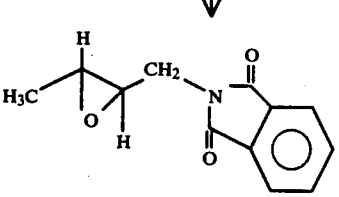

2-(Phthalimidyl methyl)-3-methyl oxirane

-continued

1-Bromo-3-phenyl-2-propene

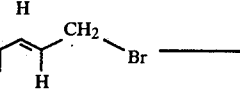

1. Pheno/K₂CO₃
2. Metachloroperbenzoic Acid

1. Potassium Phthalimide
2. Metachloroperbenzoic Acid

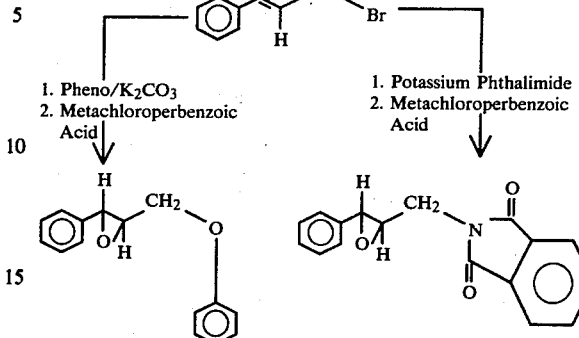

2-(Phenoxy methyl)-3-phenyl oxirane 2-(Phthalimidyl methyl)-3-phenyl oxirane

SUMMARY OF THE INVENTION

The present invention relates to an improved high molecular weight heat stable polyester and to a new and novel process for preparing it. The invention further provides polyester fibers which have excellent resistance to thermal degradation when utilized in commercial articles, such as tires, industrial belting, etc., wherein a high degree of heat is built up during use.

In accordance with the above objects, it has now been discovered that an improved heat stable fiber forming linear condensation polyester is obtained by incorporating therein a stabilizing amount of a stabilizer comprising 2-(phenoxy methyl)-3-phenyl oxirane. This novel polyester is obtained without undue difficulties in the processing thereof and the additive is compatible with other additives that may be desirable for specific uses. Also, all reactants are nonmutagenic.

The preparation of the improved polyester can be carried out by condensing an aromatic dicarboxylic acid, preferably terephthalic acid, and/or the lower alkyl ester thereof with a glycol containing 2 to about 10 carbon atoms per molecule under direct esterification and/or ester-interchange conditions. A stabilizing amount of the above-described stabilizer may be incorporated either during or after polycondensation of the polyester, i.e., when the polyester has been polycondensed to an intrinsic viscosity of 0.4 to 1.0. Intrinsic viscosity of the polyester is determined by conventional means in 60 percent phenol-40 percent tetrachloroethane mixture. Preferably, the stabilizer is added to the polyester after the final polycondensation of the polymer to an intrinsic viscosity of 0.8 to 1.0.

The esterification of the aromatic dicarboxylic acid and/or the lower alkyl esters thereof and the glycol can start at a temperature as low as 200° C. and range up to 300° C. and at atmospheric and superatmospheric pressure ranging up to 500 psig. The reaction, either the direct esterification or ester interchange is carried out in the absence of oxygen-containing gas. Preferably, the reaction temperature ranges from about 230° C. to about 280° C. and at a pressure ranging from about 50 to 250 psig. The reaction time will vary depending upon the reaction temperature and pressure. The glycol is reacted with the aromatic dicarboxylic acid and/or the lower alkyl ester thereof in an amount ranging from about 1 to about 3 mols of glycol per mole of acid. The amount of stabilizer ranges generally from 5 to 70 gram moles of oxirane compound per $10^6$ grams of the polyester. Preferably, 10 to 50 gram mols of oxirane compound is added per $10^6$ grams of the polyester.

Other additives can be added to the polymer with complete compatibility therewith to control or tailor the reactions in order to obtain required characteristics of the final polymer for specific end uses. Many such additives are known and utilized to control dyeing, static, luster, flammability, light stability, brightness, etc.

The polycondensation of the esterification product obtained by the direct esterification or ester interchange reaction between aromatic dicarboxylic acid or lower alkyl ester thereof with a glycol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measures is obtained. The duration of such periods depends upon such factors of process polymerization conditions, as pressure and temperature profiles, ingredient mole ratios, surface generation conditions, catalyst type and concentration, any additives utilized, requisite viscosity, etc. Polycondensation is generally continued until the resultant polyester has an intrinsic viscosity in 60 percent phenol-40 percent tetrachloroethane mixture of about 0.6 to 1.0, preferably 0.8 to 1.0.

DESCRIPTION OF THE PREFERRED EMBODIMENTS

As previously mentioned, the present invention further provides polyester fibers which have excellent resistance to degradation when utilized in commercial articles, such as tires, industrial belting, etc. wherein a high degree of heat is built up during use. Accordingly, one preferred embodiment of this invention may be briefly stated as follows:

In the preparation of fibers particularly useful in reinforced rubber articles such as pneumatic tires and industrial belts, from high molecular weight linear terephthalate condensation polyester, the preferred method of providing a reduction in the free carboxyl content of the polyester to a carboxyl concentration of less than 15 gram equivalents per $10^6$ grams of polyester which comprises adding to the polyester after final polycondensation of the polyester to an intrinsic viscosity of 0.8 to 1.0, a thermally stabilizing amount of a stabilizer comprising 2-(phenoxy methyl)-3-phenyl oxirane. Generally, 5 to 70 gram moles of said oxirane compound are added to the polyester per $10^6$ grams of the polyester.

The following examples are illustrative of embodiments of the present invention but are not to be construed as limiting the invention in any way.

The following Summary Table, with attendant Tables 1-6, show that only 2-(phenoxy methyl)-3-phenyl oxirane will reduce carboxyl content in a polyester compound and does not show a positive Ames test.

The tests were carried out in a Brabender Plastograph at 283° C., 30 rpm, for 5 minutes, using additive concentrations of about 30 gram equivalents per $10^6$ grams of polymer. Catalyst, where indicated, was tetrabutyl phosphonium bromide. "ΔCOOH" indicates the change in carboxyl level in the polymer in g./$10^6$ g. of polymer. "% Efficiency" indicates the difference from theoretical complete reaction of additive with carboxyl groups. "Ames test and Table Number" indicates + for positive, — for negative Ames test results and the table number where such results are found herein.

The Ames test for determining mutagenicity is described in Ames, B. N., McCann, J., Yamaski, E., Methods for Detecting Carcinogens and Mutagens with the Salmonella/Mammalian-Microsome Mutagenicity Test, Mutation Res., 31 (1975) 347–364.

Note that both mutagenicity and ability to react with carboxyls in polyesters appear to be unpredictable based on chemical structural similarity.

| | SUMMARY TABLE | | | |
|---|---|---|---|---|
| | | Brabender Evaluations | | |
| Run No. | Additive | Δ COOH | % Efficiency | Ames Test & Table Number |
| 1. | 2,3-Epoxy Propyl Phenyl Ether (PGE) + 0.02% Catalyst | −19 | 63 | + 1, 3, 5 |
| 2. | N(2,3-Epoxypropyl) Phthalimide No Catalyst | −20 | 66 | + 1, 2, 6 |
| 3. | 2-(Phenoxy Methyl)- 3 Phenyl Oxirane + 0.02% Catalyst | −12 | 41 | − 3, 5 |
| 4. | 2-(Phenyl)-3- Phthalimidomethyl Oxirane; No Catalyst | −20 | 71 | + 6 |
| 5. | N(2,3-Epoxy Butyl) Phthalimide; No Catalyst | −20 | 67 | + 1, 2 |
| 6. | 2,3-Epoxy Butane Phenyl Ether + 0.02% Catalyst | −19 | 33 | + 1, 3 |
| 7. | Beta-Methyl Styrene Oxide + 0.02% Catalyst | 0 | 0 | + 4 |
| 8. | 2,2-Dimethyl-3- Phenoxy Methyl Oxirane, 0.02% Catalyst | −1 | 4 | − 5 |
| 9. | 2,2-Dimethyl-3- | 0 | 0 | − 6 |

-continued

SUMMARY TABLE

| Run No. | Additive | Brabender Evaluations Δ COOH | % Efficiency | Ames Test & Table Number |
|---|---|---|---|---|
| | Phthalimide Methyl Oxirane; No Catalyst | | | |

TABLE 1
NUMBER OF REVERTANTS IN *S. TYPHIMURIUM* TA-100
(BACKGROUND SUBSTITUTED)

| Concentration Per Plate | Compound from Run Number | | | |
|---|---|---|---|---|
| | 1. PGE | 6. PEB | 2. EPI | 5. EBI |
| 500 | — | — | >1000 | 875 |
| 158 | — | — | >1000 | 413 |
| 50 | — | — | >1000 | 155 |
| 15.8 | — | — | >1000 | 55 |
| 5 | — | — | 502 | 16 |
| 500 | >1000 | 534 | — | — |
| 280 | >1000 | 311 | — | — |
| 155 | >1000 | 196 | — | — |
| 90 | 861 | 96 | — | — |
| 50 | 535 | 59 | — | — |

Samples of PGE, PEB, EPI, or EBI were dissolved in dimethyl sulfoxide (DMSO) and added to 2.5 ml. molten agar containing *S. typhimurium* TA-100. The agar was poured on minimal agar petri dishes and incubated for two days at which time the number of revertant colonies was determined.

CODE
1. PGE - Phenyl glycidyl ether
2. EPI - N-(2,3-epoxy propyl) phthalimide
5. EBI - N-(2,3-epoxy butyl) phthalimide
6. PEB - 2,3-Epoxy butyl phenyl ether

TABLE 2
MUTAGENICITY OF EPI AND METHYL-EPI
TO *S. TYPHIMURIUM* TA-100

| Run No. | Chemical | Dose (μg) | Net Revertants Per Plate (1) | Net Revertants Per Milligram |
|---|---|---|---|---|
| 2. | N-(2,3-epoxy-propyl)-phthalimide | 0.992 | 103.5 | 104.0 |
| | | 2.14 | 222.0 | 103.0 |
| | | 4.63 | 472.0 | 102.0 |
| | | 10.0 | 989.0 | 99.0 |
| 5. | N-(2,3-epoxy-butyl)-phthalimide | 49.6 | 138.0 | 2.78 |
| | | 107.0 | 305.0 | 2.85 |
| | | 231.0 | 578.5 | 2.50 |
| | | 500.0 | 1031.5 | 2.06 |

(1) Background of 113.0 subtracted.

TABLE 3
MUTAGENICITY OF PGE, METHYL-PGE, AND
PHENYL-PGE TO *S. TYPHIMURIUM* TA-100

| Run No. | Chemical | Dose (μg) | Net Revertants Per Plate (1) | Net Revertants Per Milligram |
|---|---|---|---|---|
| 1. | Phenylglycidyl Ether (PGE) | 20.4 | 226.5 | 11.0 |
| | | 34.6 | 391.0 | 11.0 |
| | | 58.8 | 606.5 | 10.0 |
| | | 100.0 | 905.0 | 9.0 |
| 6. | 1-Phenoxy-2,3-epoxybutane | 102.0 | 127.5 | 1.25 |
| | | 173.0 | 227.5 | 1.18 |
| | | 294.0 | 373.5 | 1.27 |
| | | 500.0 | 599.0 | 1.10 |
| 3. | 2-Phenoxymethyl-3-phenyloxirane | 198.0 | −3.0 | — |
| | | 296.0 | 1.5 | — |
| | | 444.0 | 3.5 | — |
| | | 667.0 | 14.5 | — |
| | | 1000.0 | 16.5 | — |

(1) Background of 113.0 subtracted.

TABLE 4
MUTAGENICITY OF STYRENE OXIDE AND
BETA-METHYL STYRENE
OXIDE TO *S. TYPHIMURIUM* TA-100

| Run No. | Chemical | Dose (μg) | Net Revertants Per Plate (1) | Net Revertants Per Milligram |
|---|---|---|---|---|
| — | Styrene Oxide (Aldrich Chemical Company) | 99.6 | 67.5 | 0.68 |
| | | 177.0 | 111.0 | 0.63 |
| | | 316.0 | 201.5 | 0.64 |
| | | 562.0 | 351.0 | 0.62 |
| | | 1000.0 | 522.5 | 0.52 |
| 7. | Beta-Methyl Styrene Oxide (Allied Chemical Laboratory Chemical) | 498.0 | 77.5 | 0.16 |
| | | 887.0 | 152.5 | 0.17 |
| | | 1578.0 | 212.0 | 0.13 |
| | | 2809.0 | 329.5 | 0.12 |
| | | 5000.0 | 240.0 (2) | — |

(1) Background of 113.0 subtracted.
(2) Background lawn light-indicative of toxicity.

TABLE 5
MUTAGENICITY OF PGE, DIMETHYL-PGE,
AND PHENYL-PGE TO *S. TYPHIMURIUM* TA-100

| Run No. | Chemical | S-9 (a) | Dose (μg/Plate) | Revertants/ Plate (b) |
|---|---|---|---|---|
| 1. | Phenylglycidyl Ether (c) | — | 20 | 264.0 |
| | | — | 30 | 372.5 |
| | | — | 45 | 535.5 |
| | | — | 68 | 730.5 |
| | | — | 100 | 1024.0 |
| 3. | 2-Phenoxymethyl-3-phenyloxirane (d) | — | 1000 | 26.5 |
| | | — | 1778 | 10.0 |
| | | — | 3150 | 35.5 |
| | | — | 5625 | 16.0 |
| | | — | 10000 | −9.0 |
| | | + | 1000 | 90.5 |
| | | + | 1778 | 98.0 |
| | | + | 3150 | 103.5 |
| | | + | 5625 | 124.5 |
| | | + | 10000 | 75.0 |
| 8. | 2,2-Dimethyl-3-phenoxymethyloxirane (c) | — | 250 | 49.5 |
| | | — | 445 | 49.5 |
| | | — | 788 | 38.5 |
| | | — | 1406 | 55.5 |
| | | — | 2500 | 49.0 |

(a) Aroclor 1254 induced Fisher 344 rat liver. + = with and − = without S-9.
(b) Average of two plates with background of 110 (no S-9) or 75.5 (S-9) subtracted.
(c) Added as 25 μl in dimethyl sulfoxide.
(d) Added as 100 μl in dimethyl sulfoxide.

TABLE 6
MUTAGENICITY OF EPI, DIMETHYL-EPI,
AND PHENYL-EPI TO *S. TYPHIMURIUM* TA-100

| Run No. | Chemical | S-9 (a) | Dose (μg/Plate) | Revertants/ Plate (b) |
|---|---|---|---|---|
| 2. | N-2,3-Epoxypropyl-phthalimide | — | 1.00 | 133.5 |
| | | — | 1.78 | 235.0 |
| | | — | 3.15 | 376.5 |
| | | — | 5.63 | 633.0 |
| | | — | 10.0 | 1031.5 |
| 4. | 2-Phenyl-3-phthalimidomethyl Oxirane | — | 1000.0 | 259.5 |
| | | — | 1778.0 | 292.0 |
| | | — | 3150.0 | 243.5 |
| | | — | 5625.0 | 219.0 |
| | | — | 10000.0 | 227.5 |

TABLE 6-continued

MUTAGENICITY OF EPI, DIMETHYL-EPI, AND PHENYL-EPI TO S. TYPHIMURIUM TA-100

| Run No. | Chemical | S-9 (a) | Dose (μg/Plate) | Revertants/ Plate (b) |
|---|---|---|---|---|
|   |   | + | 1000.0 | 450.0 |
|   |   | + | 1778.0 | 453.5 |
|   |   | + | 3150.0 | 384.5 |
|   |   | + | 5625.0 | 363.5 |
|   |   | + | 10000.0 | 338.5 |
| 9. | 2,2-Dimethyl-3-phthalimidomethyl Oxirane | − | 250.0 | 7.0 |
|   |   | − | 445.0 | 36.5 |
|   |   | − | 788.0 | 20.0 |
|   |   | − | 1406.0 | 26.5 |
|   |   | − | 2500.0 | 36.0 |

(a) Aroclor 1254 induced Fisher 344 rat liver. + = with and − = without S-9.
(b) Average of two plates with background of 110 (no S-9) or 75.5 (S-9) subtracted.

I claim:

1. A thermally stabilized high molecular weight linear terephthalate condensation polyester having incorporated therein a thermally stabilizing amount of a stabilizer consisting of 2-(phenoxy methyl)-3-phenyl oxirane, said thermally stabilized polyester having a free carboxyl concentration of less than 15 gram equivalents of carboxyl groups per $10^6$ grams of polyester.

2. The polyester of claim 1 wherein the linear terephthalate condensation polyester is polyethylene terephthalate.

3. The polyester of claim 1 wherein 5 to 70 gram moles of said stabilizer is incorporated per $10^6$ grams of the polyester.

4. The polyester of claim 1 wherein 10 to 50 gram moles of said stabilizer is incorporated per $10^6$ grams of the polyester.

5. In a process for the preparation of a high molecular weight linear terephthalate condensation polyester wherein terephthalic acid is reacted with a glycol containing 2 to 10 carbon atoms per molecule under esterification conditions and the resulting esterification product is polycondensed, the improvement which comprises providing a reduction in the free carboxyl content of the polyester to a carboxyl concentration of less than 15 gram equivalents per $10^6$ grams of polyester by adding to the polyester after polycondensation of the polyester to an intrinsic viscosity of 0.4 to 1.0, a thermally stabilizing amount of a stabilizer comprising 2-(phenoxy methyl)-3-phenyl oxirane, whereby all reactants are nonmutagenic.

6. The process of claim 5 wherein the linear terephthalate condensation polyester is polyethylene terephthalate.

7. The process of claim 5 wherein 5 to 70 gram moles of said oxirane compound is added per $10^6$ grams of the polyester.

8. The process of claim 5 wherein 10 to 50 gram moles of said oxirane compound is added per $10^6$ grams of the polyester.

9. In a process for the preparation of a high molecular weight linear terephthalate condensation polyester wherein terephthalic acid is reacted with a glycol containing 2 to 10 carbon atoms per molecule under esterification conditions and the resulting esterification product is polycondensed, the improvement which comprises providing a reduction in the free carboxyl content of the polyester to a carboxyl concentration of less than 15 gram equivalents per $10^6$ grams of polyester by adding to the polyester after polycondensation of the polyester to an intrinsic viscosity of 0.8 to 1.0, a thermally stabilizing amount of a stabilizer comprising 2-(phenoxy methyl)-3-phenyl oxirane, whereby all reactants are nonmutagenic.

10. The process of claim 9 wherein the linear terephthalate condensation polyester is polyethylene terephthalate.

11. The process of claim 9 wherein 5 to 70 gram moles of said oxirane compound is added per $10^6$ grams of the polyester.

12. The process of claim 9 wherein 10 to 50 gram moles of said oxirane compound is added per $10^6$ grams of the polyester.

* * * * *